United States Patent
Polisetty

(10) Patent No.: US 11,709,862 B2
(45) Date of Patent: Jul. 25, 2023

(54) SELECTIVE SYNCHRONIZATION OF DATABASE OBJECTS

(71) Applicant: GRAV1TY INC., San Jose, CA (US)

(72) Inventor: Ravindra V Polisetty, San Jose, CA (US)

(73) Assignee: Grav1ty Inc., San Jose, CA (US)

( * ) Notice: Subject to any disclaimer, the term of this patent is extended or adjusted under 35 U.S.C. 154(b) by 229 days.

(21) Appl. No.: 17/167,014

(22) Filed: Feb. 3, 2021

(65) Prior Publication Data

US 2021/0240730 A1    Aug. 5, 2021

Related U.S. Application Data

(60) Provisional application No. 62/970,163, filed on Feb. 4, 2020.

(51) Int. Cl.
| | |
|---|---|
| G06F 16/00 | (2019.01) |
| G06F 16/27 | (2019.01) |
| G06F 16/23 | (2019.01) |
| G06F 16/901 | (2019.01) |

(52) U.S. Cl.
CPC .......... *G06F 16/27* (2019.01); *G06F 16/2379* (2019.01); *G06F 16/9024* (2019.01)

(58) Field of Classification Search
CPC .............................. G06F 16/9024; G06F 16/27
See application file for complete search history.

(56) References Cited

U.S. PATENT DOCUMENTS

| | | | |
|---|---|---|---|
| 5,794,242 A | * | 8/1998 | Green .................. G06F 16/00 |
| 8,121,981 B2 | | 2/2012 | Simek et al. |
| 8,150,808 B2 | | 4/2012 | Zha et al. |
| 8,521,695 B2 | | 8/2013 | Zwilling et al. |
| 9,116,901 B2 | | 8/2015 | Bostock |
| 9,632,874 B2 | | 4/2017 | Pawar et al. |
| 10,223,365 B2 | | 3/2019 | Kottomtharayil et al. |
| 10,303,550 B2 | | 5/2019 | Kumarasamy |

(Continued)

OTHER PUBLICATIONS

ISA/US, International Search Report for International Patent Application No. PCT/US2021/016484, dated Jun. 17, 2021, 4 pages.

(Continued)

*Primary Examiner* — Alexander Khong

(74) *Attorney, Agent, or Firm* — Yantra Patents LLC; Anand P Narayan

(57) ABSTRACT

Implementations described herein relate to methods, systems, and computer-readable media to selectively synchronize database objects. In some implementations, a method includes receiving a request to synchronize records that include a corresponding root record and one or more connected records from a first database instance to a second database instance, wherein the request includes a specified graph configuration and an object boundary identifier; collecting the one or more records by traversing a corresponding graph configuration associated with each of the one or more root records; generating a snapshot that includes the one or more records into one or more object record sets based on a corresponding object boundary identifier associated with each of the one or more root records and the one or more connected records; publishing the snapshot to the second database instance; and updating the second database instance.

22 Claims, 14 Drawing Sheets

(56) References Cited

U.S. PATENT DOCUMENTS

| | | | |
|---|---|---|---|
| 10,430,434 B2 | 10/2019 | Sun et al. | |
| 10,540,173 B2 | 1/2020 | Patton et al. | |
| 10,831,707 B2 | 11/2020 | Sun et al. | |
| 10,860,237 B2* | 12/2020 | Susairaj | G06F 3/065 |
| 10,997,247 B1* | 5/2021 | Harris | G06F 16/128 |
| 11,086,545 B1* | 8/2021 | Dayal | G06F 3/067 |
| 11,249,655 B1* | 2/2022 | Chen | G06F 11/1484 |
| 11,250,019 B1* | 2/2022 | Goyal | G06F 16/24568 |
| 2011/0145186 A1* | 6/2011 | Hempelmann | G06F 16/2477 707/639 |
| 2013/0173541 A1 | 7/2013 | Iyer et al. | |
| 2015/0227600 A1 | 8/2015 | Ramu et al. | |
| 2016/0019228 A1* | 1/2016 | Hong | G06F 16/2246 707/624 |
| 2017/0168801 A1 | 6/2017 | Eberlein et al. | |
| 2018/0260403 A1 | 9/2018 | Zha et al. | |
| 2019/0220449 A1 | 7/2019 | Suehs et al. | |
| 2019/0361895 A1 | 11/2019 | Weaver et al. | |
| 2020/0175202 A1 | 6/2020 | Burnett et al. | |
| 2020/0293550 A1 | 9/2020 | Acheson et al. | |
| 2020/0310650 A1* | 10/2020 | Hadas | G06F 3/065 |
| 2020/0356447 A1 | 11/2020 | Hsieh et al. | |
| 2020/0364203 A1 | 11/2020 | Cseri et al. | |
| 2020/0372000 A1* | 11/2020 | Fuller | G06F 16/1734 |

OTHER PUBLICATIONS

ISA/US, Written Opinion of the International Searching Authority for International Patent Application No. PCT/US2021/016484, dated Jun. 17, 2021, 5 pages.

Nandal, "Spatio-Temporal Database and its Models: A Review," IOSR-JCE, Jun. 2013, 10 pages.

* cited by examiner

Select root records 710

Record A22  ○
Record A04  ○
Record D12  ○
Record D44  ○

Select record set configuration 730

Select Object Boundary Identifier(s) 740

Generate Snapshot 750

FIG. 7A

Select from snapshot 760

Snapshot SP01  ○
Snapshot SP02  ○

Select object record sets 770

Object Record set PRD01  ○
Object Record set PRD02  ○

Publish/Deploy snapshot 780

FIG. 7B

SELECTIVE SYNCHRONIZATION OF DATABASE OBJECTS

CROSS-REFERENCE TO RELATED APPLICATION

This application claims priority to U.S. Provisional Patent Application No. 62/970,163, filed Feb. 4, 2020, titled "SYSTEMS AND METHODS FOR ADDITIVE AND NON-INTRUSIVE VIRTUAL VERSIONING IN DATABASE ENVIRONMENTS" and which is incorporated by reference herein in its entirety.

TECHNICAL FIELD

Implementations relate generally to synchronization of database objects and/or records, and more particularly to selective collection, versioning, management, deployment, and synchronization of relational database records.

BACKGROUND

In many enterprises, information and configurations are stored in multiple database systems and this information is modified frequently and, in some cases, even daily, or weekly. Modifications in one database instance commonly need to be propagated to other database instances; for example, modifications to database objects at a first instance such as a test database instance may need to be propagated to a second instance such as a production database instance. In many cases, incremental changes may need migration from one database instance (say, a Developer instance) to another database instance (say, a Production instance), and in many cases, it may be impractical to make full clones or full updates of database instances. There may be other specific use-cases and requirements where only selected root records and their related records (related graph of records) may need to be propagated. In some other cases, destructive changes relative to a source database instance may need to be migrated to a destination database instance that may require destructive changes to be propagated, and data integrity requirements may require that destructive changes be identified and impacted accurately on the destination instance. Given the large volumes of enterprise data under management, there is a need for a configurable solution that can be applied to moving data incrementally and providing selective synchronization of database objects between different applications implemented on relational databases.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes receiving a request to synchronize one or more records that include a corresponding root record and one or more connected records from a first database instance to a second database instance. The receiving also includes collecting the one or more records by traversing a corresponding graph configuration associated with each of the one or more root records; generating a snapshot that includes the one or more records, where generating the snapshot includes assembling the one or more records into one or more object record sets based on a corresponding object boundary identifier associated with each of the one or more root records and the one or more connected records; publishing the snapshot to the second database instance; and updating the second database instance with at least one of the one or more object record sets included in the snapshot. Other embodiments of this aspect include corresponding computer systems, apparatus, and computer programs recorded on one or more computer storage devices, each configured to perform the actions of the methods.

Implementations may include one or more of the following features. The computer-implemented method may include: prior to updating the second database instance, comparing the snapshot to a previously stored snapshot associated with the second database instance to determine at least one modified object record set; and updating the second database instance with the at least one modified object record set. Comparing the snapshot to the previously stored snapshot may include: calculating a first checksum associated with each of the object record sets included in the snapshot; calculating a second checksum associated with each of the object record sets included in the previously stored snapshot; and identifying the at least one modified object record set based on a determination that the first checksum is different from the second checksum. Comparing the snapshot to the previously stored snapshot may include comparing tokens for each object record set included in the snapshot with tokens for a corresponding object record set included in the previously stored snapshot. The computer-implemented method may include storing the snapshot and a timestamp associated with the snapshot in a storage device associated with the first database instance. The computer-implemented method may include assigning a version identifier to each object record set included in the snapshot based on a hierarchy of a record that was modified in the at least one modified object record set. Comparing the snapshot to the previously stored snapshot may include: receiving a user input indicative of one or more object boundary identifiers of interest for comparison; and comparing object record sets associated with the one or more object boundary identifiers of interest included in the snapshot with corresponding object record sets included in the previously stored snapshot. The computer-implemented method may include: prior to updating the second database instance, generating a temporal snapshot based on the corresponding root record and one or more connected records from the second database instance; comparing the snapshot to the temporal snapshot to determine one or more modified object record sets; displaying, via a user interface, identifiers corresponding to the one or more modified object record sets and corresponding boundary identifiers associated with the one or more modified object record sets; receiving a user input indicative of at least one modified object record set to be updated in the second database instance; and updating the second database instance with the at least one modified object record set. The publishing the snapshot to the second database instance may include: comparing the snapshot with a previously generated snapshot associated with the first database instance to determine one or more modified object record sets; displaying, via a user interface, the one or more modified object record sets; receiving a selection of a subset of the one or more modified object record sets; and transmitting the subset of the one or more modified object record sets to the second database instance. Transmitting the modified object record sets to the second database instance may include transmitting only destructively modified object record sets, where a destructively modified object record set may include a modified object record set that includes at least one deleted record when compared to a corresponding object record set included in the previously generated snapshot. The object boundary identifiers may include a primary object boundary identifier and a secondary object boundary identifier, and where a root record associated with a primary object boundary identifier and included in a first object record set is not included in a second object record set of the record set. Each root record is associated with at least a primary object boundary identifier and a secondary object boundary identifier, where the primary object boundary identifier is different from the secondary object boundary identifier. The computer-implemented method may include storing the snapshot and a timestamp associated with the snapshot in a storage device associated with the second database instance. Implementations of the described techniques may include hardware, a method or process, or computer software on a computer-accessible medium.

One general aspect includes a computer-implemented method. The computer-implemented method also includes receiving a request, at a database instance, to revert a root record from a current state of an application datastore to a previous state of the application datastore; selecting a snapshot that includes the root record; displaying, via a user interface, one or more object boundary identifiers associated with the root record; receiving, via the interface, user input indicating a subset of the object boundary identifiers to be utilized to revert the root record; obtaining a plurality of object record sets associated with the subset of the object boundary identifiers; and deploying the plurality of object record sets in the database instance. Other embodiments of this aspect include corresponding computer systems, apparatus, and computer programs recorded on one or more computer storage devices, each configured to perform the actions of the methods.

Implementations may include one or more of the following features. The computer-implemented method where selecting a snapshot that includes the root record may include selecting the snapshot from one or more versions of the snapshot stored in one of: a storage device associated with the database instance and a storage device associated with a version data storage system. The snapshot includes the root record. Implementations of the described techniques may include hardware, a method or process, or computer software on a computer-accessible medium.

One general aspect includes a non-transitory computer-readable medium may include instructions that. The non-transitory computer-readable medium also includes receiving a request to generate a snapshot of one or more records that include a corresponding root record and one or more connected records associated with a database instance, where the request includes a specified graph configuration and an object boundary identifier associated with each of the one or more root records and the one or more connected records; collecting the one or more records by traversing a corresponding graph configuration associated with each of the one or more root records; and generating the snapshot that includes the one or more records, where generating the snapshot includes assembling the one or more records into one or more object record sets based on a corresponding object boundary identifier associated with each of the one or more root records and the one or more connected records. Other embodiments of this aspect include corresponding computer systems, apparatus, and computer programs recorded on one or more computer storage devices, each configured to perform the actions of the methods.

Implementations may include one or more of the following features. The non-transitory computer-readable medium may include storing the snapshot and a timestamp associated with the snapshot in a storage device associated with the database instance. Storing the snapshot may include: obtaining a previous version of the snapshot; comparing the object record sets in the snapshot with corresponding object record sets in the previous version of the snapshot to determine one or more modified object record sets; and storing the one or more modified object record sets as the snapshot. Comparing the object record sets in the snapshot with corresponding object record sets in the previous version of the snapshot may include comparing tokens for each object record set included in the snapshot with tokens for a corresponding object record set included in the previous version of the snapshot. Implementations of the described techniques may include hardware, a method or process, or computer software on a computer-accessible medium.

BRIEF DESCRIPTION OF THE DRAWINGS

FIG. 7A illustrates example selection of database objects via a user interface utilized to synchronize database objects, in accordance with some implementations.

FIG. 7B illustrates example selection of database objects via a user interface utilized to synchronize database objects, in accordance with some implementations.

DETAILED DESCRIPTION

Figure 1A:
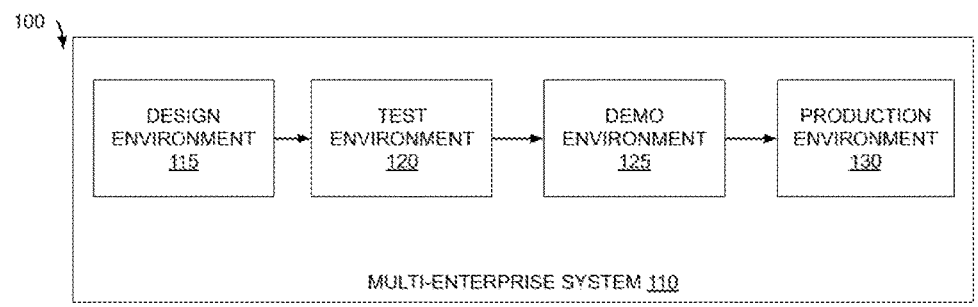
FIG. 1A is a diagram of an example system environment to perform selective synchronization of database objects, in accordance with some implementations.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be implemented in connection with other implementations whether or not explicitly described.

A letter after a reference numeral, such as "610," indicates that the text refers specifically to the element having that particular reference numeral. A reference numeral in the text without a following letter, such as "610," refers to any or all of the elements in the figures bearing that reference numeral (e.g. "610" in the text refers to reference numerals "610*a*," "610*b*," and/or "610*n*" in the figures).

Enterprise systems manage their data using databases—such as relational databases, object-oriented databases, hierarchical databases, etc. For example, most product catalogs, business configuration data, customer data, order data, inventory data, etc., are stored in databases. The configuration information changes frequently and in many cases on a daily, or even hourly basis. It would be advantageous for database users to have the functionality to manage versions of database objects, revert to previous versions, etc., similar to functionality that is available for software development with files, etc. Analogous to software codebase(s) in the software domain, database users could benefit from systems, methods, and tools to propagate selective changes between database systems in their lifecycle of project activities.

The manner in which database data records and/or object information is stored in database systems poses certain challenges to the repurposing of general-purpose file/code versioning tools in that database data records and objects are handled and stored in a very different way from the way in which software files are stored and managed. Additionally, database data objects are commonly highly inter-connected (e.g., via linked objects, foreign keys etc.) via graphs and can make it difficult to version and/or manage versions of graph related database objects. This disclosure describes a 'general purpose' mechanism to support flexible, selective versioning, selective reversion, and support functional/object level versioning that goes beyond record level versioning.

Techniques of this disclosure address methods and processes for defining how to selectively build incremental snapshots (packages) made up of records with different boundary affinities, and to manage versioning of records at various boundaries, and to selectively compare and deploy records. Configurable mechanisms are described that are defined by Connection selectivity policies, Connection boundary affinity policies, building incremental data snapshots enforcing connection policies, propagating data snapshots across instances, identifying constructive and destructive changes for a given data snapshot on target instance, providing high selectivity of what to impact on destination, and impacting the target instance with proper constructive and destructive changes. A high degree of selectivity is provided at each stage of the process of handling database objects, which can be utilized in a variety of database operations, e.g., to revert a targeted record set or record sub-sets based on a boundary, redo a particular data operation, etc. The processes and methods may also be applied within a single instance of a database whereby various data snapshots may be collected at different times to manage database versions in a temporal fashion. Using the same techniques, one can selectively update or revert object record sets/sub-sets and rewind or go-forward in a very selective fashion. Unlike database mechanisms where reverting to an earlier database state requires a complete migration (e.g., a rewind or forward) of the database to a particular bookmark that is associated with a particular state of a database instance, techniques of this disclosure enable selective and/or highly targeted rewind or go-forward mechanisms for particular records and/or sets of records.

Database records have complex connections/links which connect to other related records; hence, moving records between instances must ensure connections are properly re-established on the target instance. Moving a set of records may involve various strategies such as moving all or some related records via their connections, and ensuring that references to other connections are properly re-established.

A technical problem in relational database is the selective synchronization of database objects and records. Efficient synchronization of database objects can additionally provide savings of time, computational resources, and power.

FIG. 1A is a diagram of an example system environment to perform selective synchronization of database objects, in accordance with some implementations.

The Enterprise Systems and Application Data Systems referred in this disclosure may participate in a multi-system environment and may be of different operating systems and may also be compatible with different application versions.

FIG. 1A is a block diagram of an example system environment which may be used for one or more implementations described herein and depict a typical enterprise pipeline. The pipeline depicts a sequence of computing environments that are included in a multi-enterprise system 110. The multi-enterprise system includes computing environments that are utilized in a design environment 115, test environment 120, demonstration (demo) environment 125, and a production environment 130.

In some enterprise implementations, the multi-enterprise system can include multiple design, test, and/or production environments. Database modifications are commonly migrated/propagated between environment, for example, from a design environment to a test environment, from a test environment to a demo environment, and from a demo environment to a production environment.

While not explicitly depicted in FIG. 1A, in some implementations, the database changes and/or modifications may be propagated over multiple iterations and may also be propagated in a reverse direction that described earlier. For example, database modifications may be migrated/propagated from a production environment back to a design environment. In most cases, an ideal requirement is to propagate only the incremental changes from one enterprise system to the other enterprise system.

Figure 1B:
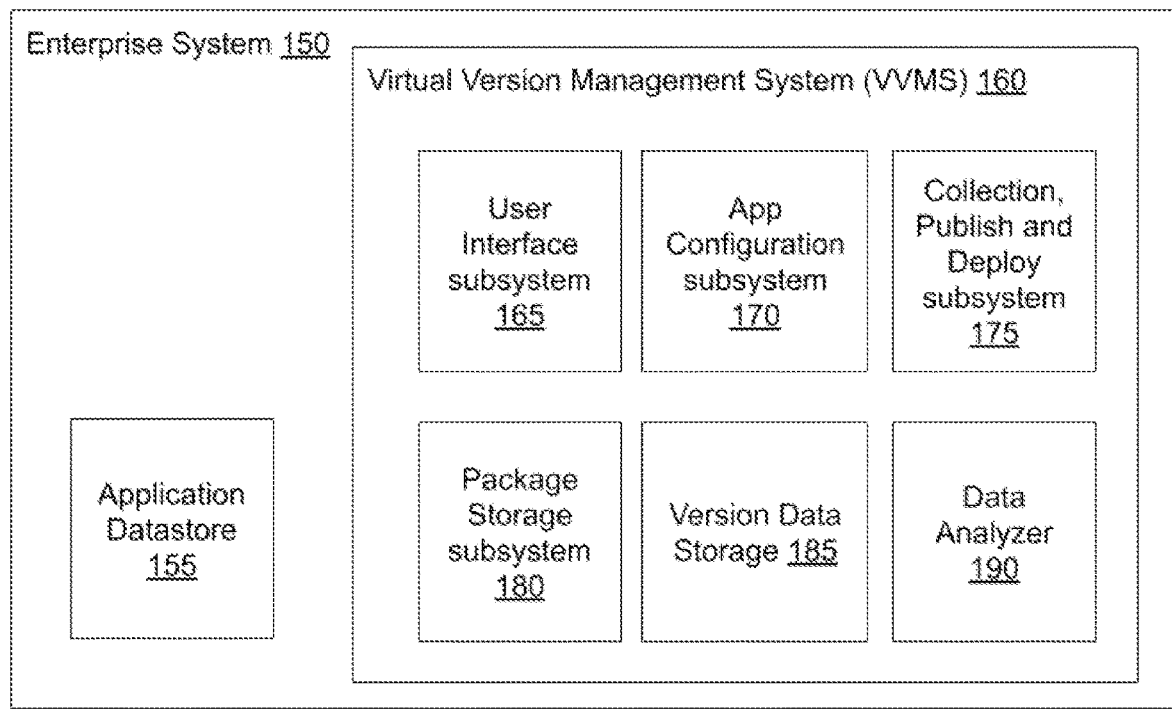
FIG. 1B is a diagram that depicts example subsystems and modules within an enterprise system, in accordance with some implementations.

FIG. 1B is a diagram that depicts example subsystems and modules within an enterprise system, in accordance with some implementations.

FIG. 1B is a block diagram that illustrates a system environment configured to provide selective synchronization of database objects. The system environment includes an enterprise system 150 that further includes an Application datastore 155 and a Virtual Version Management System 160.

The Virtual Version Management System (VVMS) 160 includes several subsystem components and/or modules that are utilized to manage the collection of database objects such as database records, create snapshots (packages) that include database objects, enable comparisons of database objects, e.g., between current and previous snapshots, and to manage versions of database objects and/or snapshots that may have been generated at different points in time, and/or from different sources.

The VVMS includes a user interface subsystem 165, an application (App) configuration subsystem 170, a collection, publish, and deploy subsystem 175, a package storage subsystem 180, version data storage 185, and data analyzer 190.

Application data from one or more sources for incremental or full migration to a target database instance is stored in the Application datastore 155.

The User Interface subsystem 165 enables a database user and/or administrator to perform various database management tasks and functions. Visual, audio-visual, and other interfaces may be provided to enables users to perform various actions, e.g., set-up database objects and connections, configure database functions and objects, support user selection of records or sets of records, publish sets of records to other database instances, deploy sets of records, view snapshots (packages) and results of data analysis, manage versioning of snapshots, perform reversion of sets of records, etc.

App Configuration subsystem 170 is utilized for the management of metadata, e.g., configuration of database objects (tables) and related links/connections, configuration of connection selectivity graphs associated with records, and boundary affinity configurations of records.

Collection, Publish, and Deploy subsystem 175 enables processing of requests to collect a set of records based on one or more root records, and for execution of the request to collect related records based on the specified connection selectivity configuration and boundary affinity configurations, e.g., to create a snapshot (package) of the records. Based on a user selection of a full set or a partial (subset) of records, a generated snapshot (package) can be published by the Collection, Publish, and Deploy subsystem to a target database instance and/or deployed to Application datastore 155.

The Package storage subsystem is utilized for the storage and management of generated snapshots (packages), e.g., snapshots generated by VVMS 160. It serves as a repository for generated snapshots (packages) and enables users and/or database administrators to view, delete, archive, or analyze one or more created snapshots (packages). Policies may be specified and applied for certain automated management of snapshots stored in the package storage subsystem.

The Version Data Storage System (VDSS) 185 is utilized to store versions of sets of records (e.g., object record sets) that have been requested to be checked-in by the user along with associated time stamp information and other version indicators.

The Data Analyzer 190 is utilized to compare and analyze snapshots, e.g., to perform comparisons between two snapshots, or between objects record sets included in a snapshot and object record sets included in a corresponding version history of object record sets. For example, a comparison and contrast of two different snapshots (packages) generated at different times may be performed by the Data Analyzer 190.

In some implementations, the VVMS system may be hosted in the same storage system as the enterprise system. In some implementations, the VVMS system may be hosted in an external storage system or media. In some implementations, the VVMS system may be hosted in a multi-tenant cloud-based service.

Figure 2:
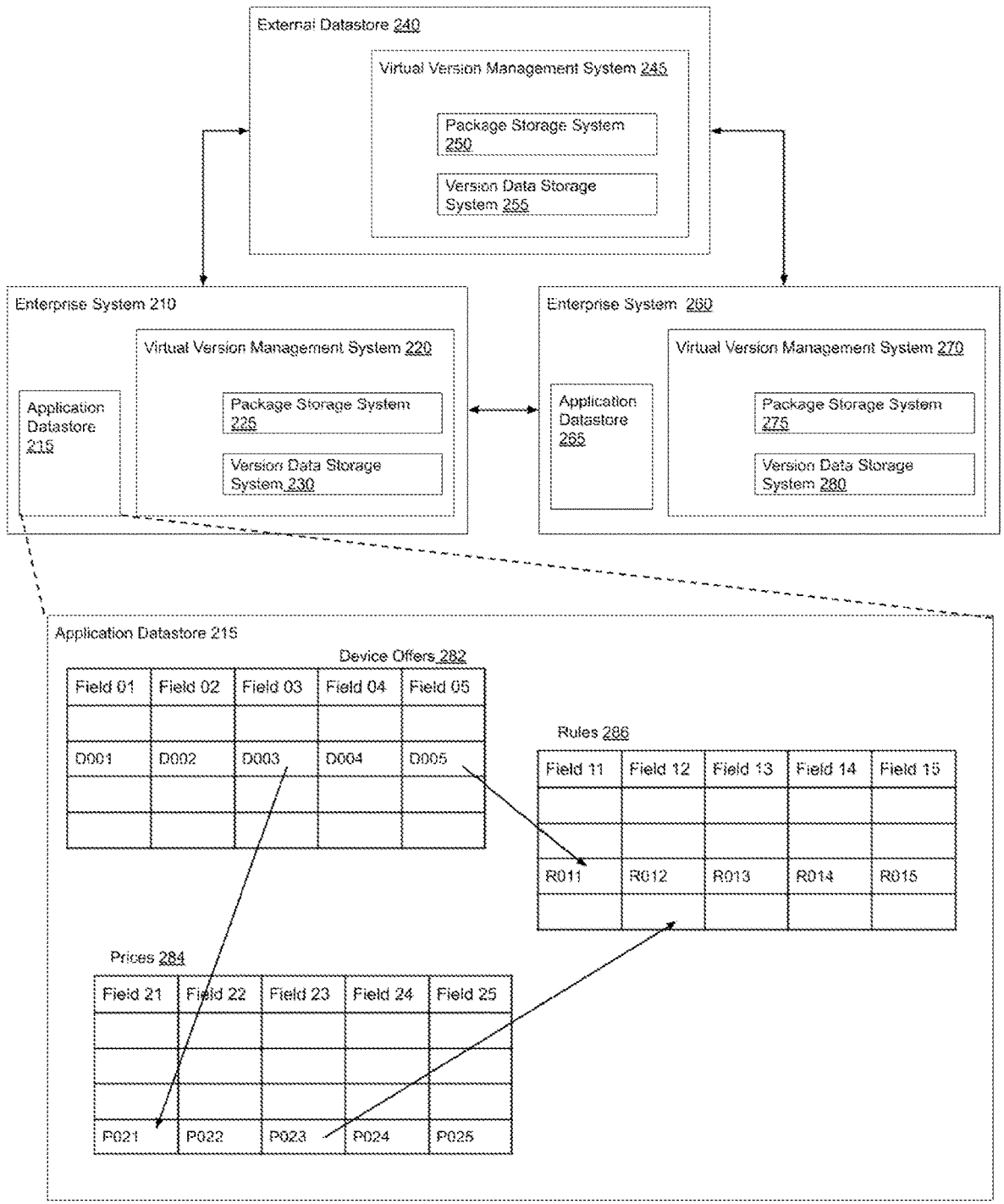
FIG. 2 depicts inter-connected objects in a relational database representation in an enterprise system and example system components utilized to selectively synchronize database objects, in accordance with some implementations.

FIG. 2 depicts inter-connected objects in a relational database representation in an enterprise system and example system components utilized to selectively synchronize database objects, in accordance with some implementations.

In this illustrative example, a first enterprise system 210 and a second enterprise system 260 are depicted. An external datastore 240 is also depicted and is connected to the first enterprise system and the second enterprise system. Each of the first enterprise system and the second enterprise system include a respective Application datastore(s), Application datastore 215 and Application datastore 265.

The enterprise systems and external datastore additionally include an operating instance of a Virtual Version Management System, (e.g., similar to VVMS 160 described with reference to FIG. 1B). In some implementations, each of the enterprise system and external datastore may utilize separate implementations of VVMS, e.g., VVMS 220, VVMS 270, and VVMS 240, as depicted in FIG. 2. In some other implementations, a single implementation of VVMS may be utilized across the enterprise systems and external datastore, e.g., over a network, or as part of a cloud-based service.

FIG. 2 additionally depicts example inter-connected objects/records that are stored in an Application datastore in a typical relational database representation. In databases, and more particularly in relational databases, information is stored in the form of tables that include rows and columns. A table may represent a database object such as a customer account or customer order.

A table includes a plurality of records (or tuples). A data record (or record) is commonly used to refer to a single record in a table. In most enterprise applications, data records are interconnected with other data records. These connections can be of different types (such as one-to-one, one-to-many, many-to-many connections etc.).

FIG. 2 depicts an example of three linked objects (tables), Device offers 282, Prices 284, and Rules 286. As depicted, records within each object may be linked to records in other object(s). For example, a particular record ('D003') in the Device Offers object may be linked to a record in the Prices object (P021'). As other examples, record 'D005' in the Device offers object may be linked to record ('R011') in the Rules object, and record 'P023' may be linked to record 'R012' in the Rules object. The links themselves may be based on business rules and policy that associate certain records in a particular object with certain records in other objects. For example, the links may be utilized within the application datastore to configure what prices and rules may be applicable to various device offers that may be offered to customers in an enterprise context.

The system depicted in FIG. 2 may be utilized by a user or database administrator to move/migrate data records between databases, for example, from Application Datastore 215 to Application Datastore 265. The migration may be performed directly between enterprise system 210 and enterprise system 260, or in some implementations, via external datastore 240. A user may choose to move all data records from a datastore (full migration), or a partial set of data records (incremental migration). Even in the case of incremental migration, techniques of this disclosure may enable a user to select a subset of data with a certain specificity (e.g., moving all data records and related records associated with a given time stamp, moving a specifically selected set of records, etc.)

Figure 3:
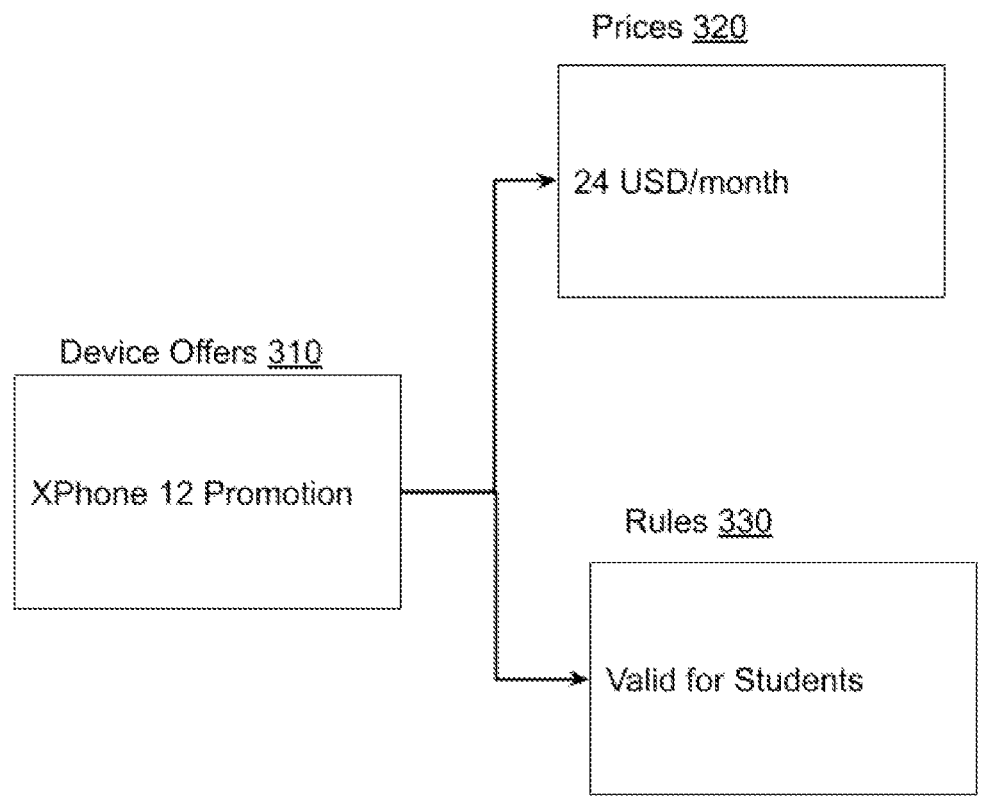
FIG. 3 depicts an example connected data model, in accordance with some implementations.

FIG. 3 depicts an example connected data model, in accordance with some implementations.

FIG. 3 depicts example connected data objects that may be included in an Application Datastore in an example enterprise system. Three database objects (Tables) are depicted; a first database object 310 is a table of Device Offers Table/Object which is linked to a second database object 320, which is a table of prices associated with the offer. Database object 310 is additionally linked to a third database object 330, which is a table of Rules that are applicable for the offer. The three database objects are connected via links/connections as depicted; a graph representation is commonly utilized to specify a configuration for connected data objects.

In this illustrative example, the first database object may be specified as a root object, and the "XPhone 12 Promotion" a root record. When the "XPhone 12 Promotion" root record is selected, and a user specified collection of connected records associated with the root record, related Price(s), and related Rule(s) associated with the "XPhone 12 Promotion" root record are collected as one information set.

Figure 4:
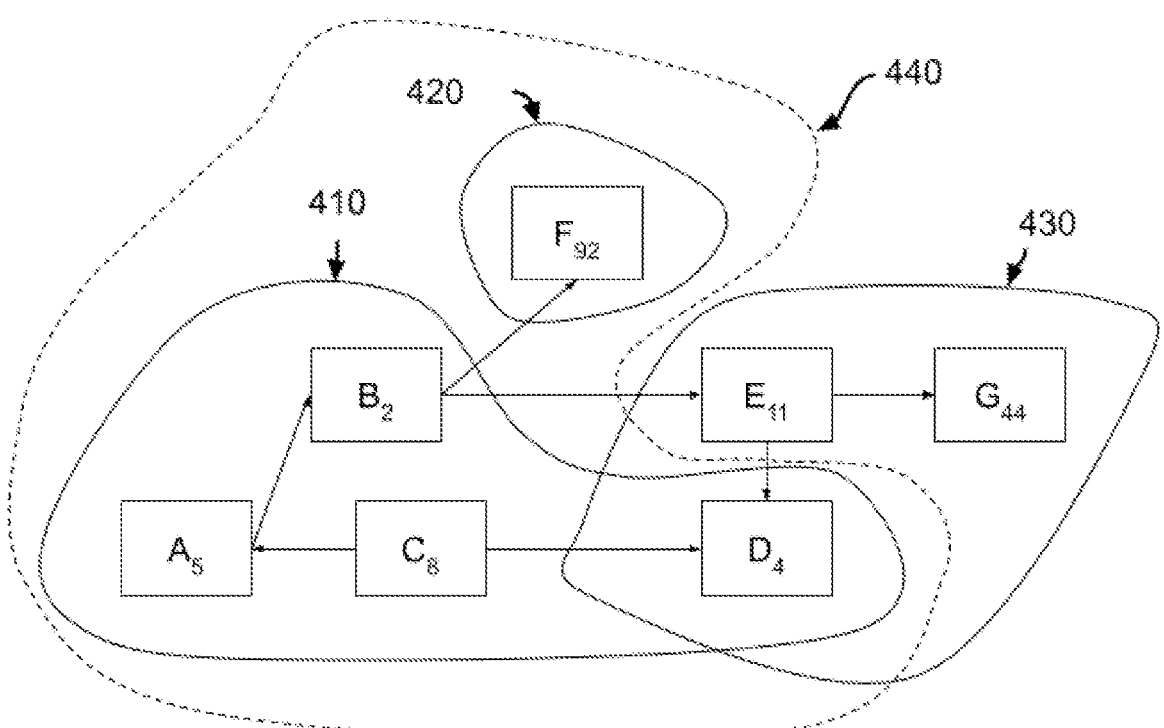
FIG. 4 depicts example connected records and associated boundary affinities, in accordance with some implementations.

FIG. 4 depicts example connected records and associated boundary affinities, in accordance with some implementations.

Per techniques of this disclosure, a connected data model may be utilized to provide flexibility in the generation of data snapshots, particularly for use in migration of database objects across and between database instances. A user specifies links and/or connections to be traversed for the collection of database records.

FIG. 4 depicts an example connected data model. The data model depicted in FIG. 2 includes seven Tables/Objects and their constituent records; Object A with multiple records denoted by A[i], Object B with multiple records denoted by B[j], Object C with multiple records denoted by C[k], Object D with multiple records denoted by D[m], Object E with multiple records denoted by E[n], Object F with multiple records denoted by F[o], and Object G with multiple records denoted by G[p]. As described earlier, each data object may represent a table that is associated with various parameters in a business or enterprise context.

The connected data may include links between specific records from each of the data objects to specific records in one or more other data objects. For example, as depicted in FIG. 2, record A5 is connected to record B2 and record C8, record C8 is further connected to D4, and so on.

As depicted in FIG. 1, the data connections may also be associated with a directionality as per the database implementation (for example, from object B to object A vs. from object A to object C). Data connections may be governed by cardinality rules such as one to one, one to many, many to many, etc. and may also include polymorphic connections.

A connection configuration (graph configuration) may be specified for each record that associated each record with one or more connected records. Multiple simultaneously valid connection configurations may be specified for a record, each of which may connect the record to a different set of records. One or more records may also be designated as a root record for a particular connection configuration.

A connection configuration may be utilized to collect a set of records, for various uses such as snapshot generation, snapshot comparison, migration of all or some of the set of records, etc. The connection configuration may enable a user or database administrator to specify which of a set of possible connections to connected records are to be traversed to collect a specified set of records, along with a specification of a directionality of traversal. The connection configuration may also specify a set of connected records that are to be skipped and may also specify a set of connected records to be maintained as a reference.

For example, an example connection configuration may be utilized to specify that a record A5 be collected, along with directly connected records B2 and C8. In another example, a different connection configuration may be utilized to specify that record A5 be collected, along with directly connected record B2, as well as indirectly connected record D4, while skipping record C8.

In some implementations, the connection configuration may be specified as a rule, e.g., nearest neighbor records, all connected records, etc.

In some implementations, one or more connection configurations may be defined for the data objects themselves; one connection configuration may selectivity connect Object A to Object B, Object C, and Object D. In another configuration, the connection configuration may specify exclusion of Object B, while including Object C and Object D.

In addition to providing record selection selectivity, additional collection criteria (such as collecting active records only) may be included to further ensure data integrity and to ensure meeting business & functional needs.

The database system may enable specifying a boundary affinity associated with each record in the database. A user or database administrator may define a boundary affinity for one or more records, objects, and/or nodes of a connected graph. The boundary affinity may be based on a business or functional logic or be based on logical consistency of underlying records (e.g., all related records of a Product may be assigned a common boundary affinity), etc. In some implementations, a boundary affinity of a database object may be associated with an ownership and/or source of the database object, e.g., associated with a source application where the database object and/or associated records are created, maintained, processed, etc.

For example, in an airline enterprise system, different database objects may be utilized for fares (or fare buckets), rules associated with those fares, number of seats currently allotted to the corresponding fare bucket, etc. When a customer searches for a fare, records from all the different database objects are utilized to provide the customer with information about availability, pricing, and rules associated with the fare. However, management and ownership of each database object may be associated with different business entities within the airline. For example, revenue management may control the number of seats allotted per fare bucket, a regulatory department may control the rules, and fares may be controlled by yet another entity, or in some cases, even an external entity. In such a scenario, enabling selectivity in management of database objects using a boundary affinity may enable superior data integrity.

Multiple layers of boundary affinities may be defined for each record, with a different functional meaning associated with the boundary affinity boundary layers. For example, as depicted in FIG. 4, a first boundary 410 (e.g., a primary boundary) may be defined for Object A which includes connected records from Object B, Object C, and Object D. A second boundary 440 may also be defined for Object A (e.g., a secondary boundary) which includes records from Object B, C, and D as well as records from Object F.

In this illustrative example, a third boundary 430 may be defined for Object E, and connected objects, Object D and Object G. A fourth boundary 420 may be defined for Object F without any connected objects within boundary 420. In some implementations the boundary definition may be implicitly defined such as graph depth/level or parent/child.

Sets of records that share a common boundary affinity may be considered as Object record sets, and each record may be included in different object record sets that are associated with same or different boundary affinities.

In some implementations, the boundary affinities for a record may be characterized by respective object boundary identifiers associated with the record. The object boundary identifier(s) associated with each record may be stored as part of the record itself, or as part of metadata associated with the object that the record is included in. In some implementations, the metadata and object boundary identifiers may be stored separately from the records themselves. The object boundary identifiers are persisted through all database instances where the corresponding object/record is stored and tracked.

The boundary affinities and object boundary identifiers are maintained, for example, at run-time execution, in addition to other metadata that may be associated with the database objects, e.g., graph depth level of a record, parent/child relationship of records, etc. The boundary affinities and object boundary identifiers associated with data records are maintained throughout a life-cycle process associated with the record/object—from creation, collection, publishing, and deployment of the data record/object.

In some implementations, each root record is associated with at least a primary object boundary identifier and one or more distinct secondary object boundary identifier(s), wherein the primary object boundary identifier is different from the secondary object boundary identifier.

In some implementations, the object boundary identifiers associated with a record may also be utilized to configure storage within a datastore. For example, root records and connected records to the root record that share an object boundary identifier may be stored in the same block and/or storage volume to efficiently optimize collection and synchronization of records.

Figure 5:
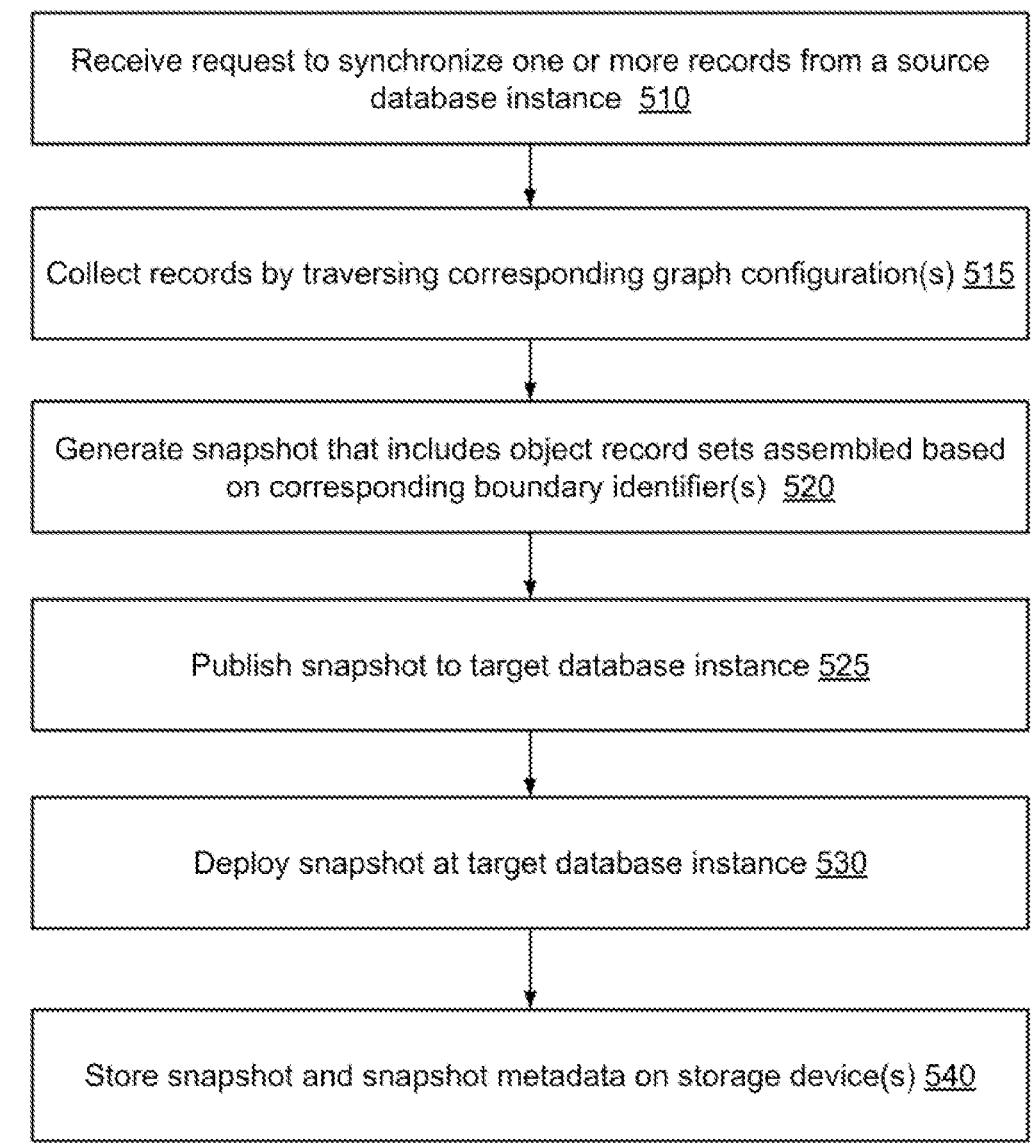
FIG. 5 a flowchart illustrating an example method to synchronize data objects, in accordance with some implementations.

FIG. 5 a flowchart illustrating an example method to synchronize data objects, in accordance with some implementations.

In some implementations, method 500 can be implemented, for example, a server associated with enterprise system described with reference to FIG. 1B. In some implementations, some or all of the method 500 can be implemented on one or more of subsystems included in enterprise system 150 as shown in FIG. 1B, on one or more developer devices, or on one or more server devices, and/or on a combination of developer device(s), server device(s) and client device(s). In described examples, the implementing system includes one or more digital processors or processing circuitry ("processors"), and one or more storage devices (e.g., a datastore 155, 185, or other storage device). In some implementations, different components of one or more servers and/or clients can perform different blocks or other parts of the method 500. In some examples, a first device is described as performing blocks of method 500. Some implementations can have one or more blocks of method 500 performed by one or more other devices (e.g., other client devices or server devices) that can send results or data to the first device.

In some implementations, the method 500, or portions of the method, can be initiated automatically by a system. In some implementations, the implementing system is a first device. For example, the method (or portions thereof) can be periodically performed at a predetermined frequency, or performed based on one or more particular events or conditions, e.g., occurrence of a predetermined volume of database object modifications, a predetermined time period having expired since the last performance of method 500, modifications to graph configurations, modifications to object boundary identifiers, and/or one or more other conditions which can be specified in settings read by the method.

Method 500 may begin at block 510.

At block 510, a request is received to synchronize one or more records that include a corresponding root record and one or more connected records from a first database instance to a second database instance.

In some implementations, the request includes a specified graph configuration and an object boundary identifier associated with each of the one or more root records and the one or more connected records.

The request for synchronization may be received via a user interface (e.g., at a user interface subsystem 165 described with reference to FIG. 1B), or may be initiated by a subsystem of a VVMS as part of a synchronization operation of records, a comparison of records, a creation of a new version, etc. Processing continues to block 515.

Figure 6:
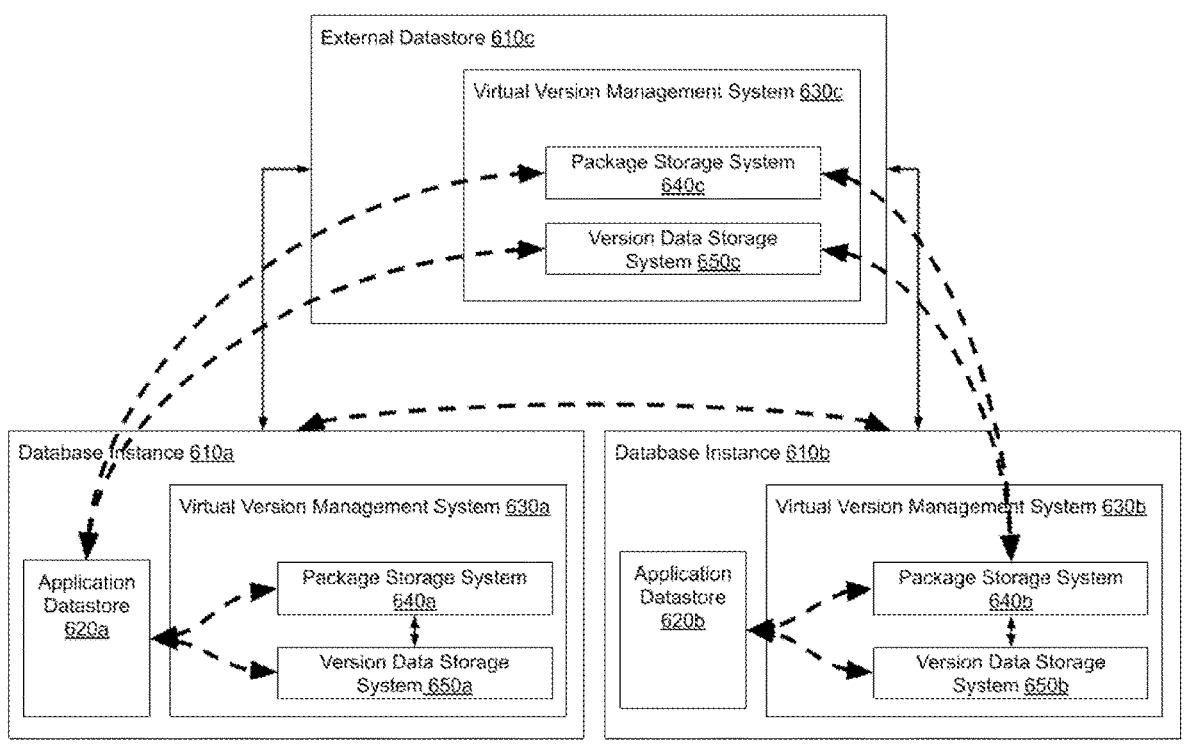
FIG. 6 illustrates example synchronization, migration, and comparisons of database objects across database instances and storage devices, in accordance with some implementations.

FIG. 6 illustrates example synchronization, migration, and comparisons of database objects across database instances and storage devices, in accordance with some implementations.

FIG. 6 depicts two database instances of an enterprise system, Database Instance 1 610a and Database Instance 2 610b, as well as an External Datastore 610c. A Virtual Version Management System (VVMS) 630 is also provided in each of the database instances and in the external datastore.

A user may select root records from Database Instance 1 610a, specify a set of connected records to be collected, and can generate a snapshot (package) for storage in a package storage system. The snapshot may be stored in a package storage system 640a in the same database instance, in a package storage system 640b associated with Database Instance 2 610b, or on a package storage system 640c associated with an external datastore 610c.

A generated snapshot may be published (transmitted) to a target database instance, for example, to Database Instance 2 610b. In some implementations, a generated database at a source database instance may be published to a package storage system, e.g., package storage system 640b associated with a target database instance.

A published snapshot may be deployed at a local application datastore 620b at a target database instance.

At block 515, one or more records are collected by traversing a corresponding connection configuration associated with each of the one or more root records. In some implementations, the configuration may be a graph configuration that is utilized to specify connected records, and corresponding actions for each record. For example, the graph configuration may include information about whether to collect a particular connected record, ignore a particular connected record, or utilize a connected record as a reference record (without collection). The graph configuration may also specify a directionality of traversal for one or more edges of the graph.

The connection configuration may also include information about boundary affinities associated with a root record and/or connected records. In some implementations, the boundary affinities may be identified based on one or more object boundary identifiers associated with each record.

In some implementations, the connection configuration may be specified based on predetermined policy and/or rules, and may be specified at a time of initial set-up of the database instance, at a time of creation of a database object, at a time of creation of a new record, etc.

In some implementations, the connection configuration may be derived (based) on user input received via a user interface, e.g., a user interface provided via a user interface subsystem 165 described with reference to FIG. 1B. The user interface may enable a user to build a connection configuration with user selection of one or more root records as a starting point. The user interface may additionally enable a user to build/select a connection configuration with user selection of one or more snapshots as a starting point.

FIG. 7A illustrates example selection of database objects via a user interface utilized to synchronize database objects, in accordance with some implementations.

FIG. 7A illustrates user selectivity of root records and selection of a connection configuration. A user may be provided with an option to select 710 one or more specific root records and their connected (related) records that are to be migrated/synchronized. As user may also be provided with a option to select (730) a record set configuration. A user may also specify root record selection via queries (for example, by posing a query to retrieve all records with a name commencing with a certain string or regular expression, by posing a query to retrieve all root records and/or connected records modified after a given time, etc.), or some combination thereof.

The user may also be provided with an option to select a connection configuration from a choice of previously determined connection configurations to enable easy connection configuration selectivity. In some implementations, a user may generate a custom connection configuration based on their specific use-case, preferences, business need, etc. In some implementations, a set of connected records may be displayed to a user via a user interface to enable a user to select records from a set connected records to build a custom connection configuration.

The user interface also enables a user to specify one or more boundary affinity configurations to be utilized to generate a snapshot. A user may select one or more object boundary identifier(s) 740 to be utilized to build the snapshot.

In some implementations, each root record is associated with at least a primary object boundary identifier and a secondary object boundary identifier, wherein the primary object boundary identifier is different from the secondary object boundary identifier.

Based on selection of one or more root records, a connection configuration that specifies corresponding connected records (to the root record(s)), and one or more object boundary identifiers, a user may initiate 750 snapshot generation.

In some implementations, a user interface enables a user to build/select a connection configuration with user selection of one or more snapshots as a starting point.

FIG. 7B illustrates example selection of database objects via a user interface utilized to synchronize database objects, in accordance with some implementations.

As depicted in FIG. 7B, a user interface provides 760 a user to build/publish/deploy a new snapshot with an existing snapshot as a starting point. Upon a user selecting this route, existing snapshots are displayed via a user interface for user selection.

Based on user selection of a snapshot, one or more object record sets included in the selected snapshot are displayed via the user interface for user selection. Generation of a new snapshot is based on user selected object record set(s), which includes implicit information about boundary affinities of constituent records included in the object record set(s).

Method 500 proceeds to block 520.

At block 520, a snapshot is generated that includes one or more selected records. The selected records include one or more root records and connected records as specified in a connection configuration. A snapshot is generated based on the selected records that are assembled/organized based on corresponding object boundary identifier associated with each of the one or more root records and the one or more connected records.

Figure 8:
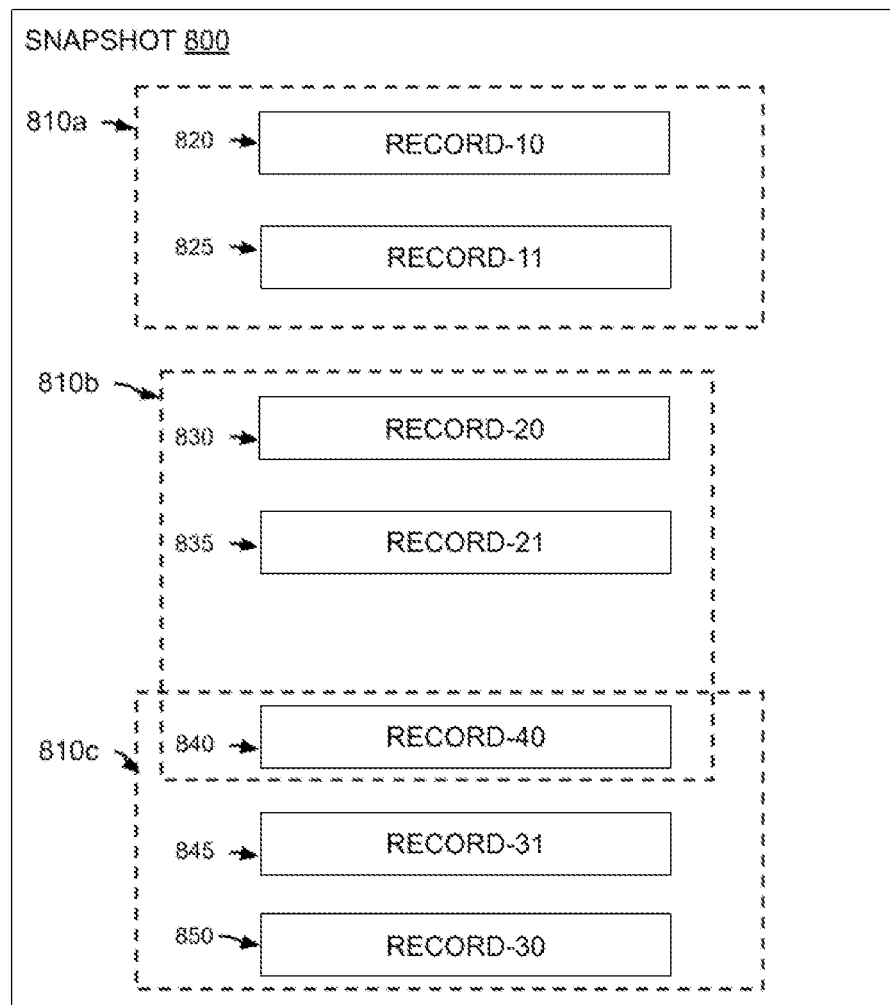
FIG. 8 depicts an example snapshot, in accordance with some implementations.

FIG. 8 depicts an example snapshot, in accordance with some implementations.

FIG. 8 shows an example generated snapshot 800 based on selected root records and a related graph of records. The selected root records and related graph of records may be collected, for example, by traversing a connection graph that is specified in a connection configuration. A snapshot 800 may include multiple records that are organized based on their boundary affinities.

In this illustrative example, snapshot 800 includes three object record sets, 810*a*, 810*b*, and 810*c*, each bounded by respective boundaries. Object record set 810*a* includes a set of records 820 and 825 associated with a first object boundary identifier. In some implementations, an object record set includes at least one root record and one or more connected records. In this illustrative example, object record set 810*a* includes a root record 820 and connected record 825. Object record set 810*b* includes a set of records 830, 835, and 840 associated with a second object boundary identifier. Object record set 810*c* includes a set of records 845, 850, as well as record 840 and is associated with a third object boundary identifier.

In some implementations, the object boundary identifiers comprise a primary object boundary identifier and a secondary object boundary identifier. A root record associated with a primary object boundary identifier and included in a first object record set is not included in a second object record set.

One or more mechanisms may be utilized to uniquely identify records in a snapshot. In some implementations, a row identifier (row id) or record identifier (record id) may be utilized to identify each record in a snapshot. Alternately, in some other implementations, additional identifiers or fields included in the records, or combination of fields in the record may be utilized to uniquely identify a record. Each record in the snapshot is marked with an identifier. In another implementation, alternate identifiers may be utilized to match a record.

Method 500 proceeds to block 525.

At block 525, the snapshot is published, for example, to a second database instance.

In some implementations, the publishing may be performed automatically on completion of snapshot generation, based on instructions received prior to snapshot generation. In some other implementations, publishing may be performed at a subsequent time.

In some implementations, a user interface may be provided to enable users to selectively publish only selected object record sets in the snapshot.

A package storage subsystem, e.g., similar to package storage subsystem 180 described with reference to FIG. 1B may be utilized. A user may select one or more snapshots (packages) to publish from a set of snapshots stored in the package storage subsystem. A user may further sub-select a smaller subset of object record sets to publish, thereby providing additional selectivity for publishing snapshots. Records that correspond to the selected object record sets are identified based on the boundary affinity (and/or object boundary identifiers) in the package. One or more target databases instance may be selected by the user, and the process of publishing is initiated.

In some implementations, prior to publishing a snapshot, the generated snapshot may be compared to a previously generated snapshot associated with the first (source) database instance, e.g., a snapshot stored in a package storage subsystem associated with the first database instance. In some implementations, user input may be received that is indicative of one or more object boundary identifiers of interest for the comparison. Object record sets associated with the one or more object boundary identifiers indicated in the user input and included in the snapshot may be utilized to selectively compare object record sets in the generated snapshot with corresponding object record sets included in the previously stored snapshot.

In some implementations comparing the snapshot to a previously stored snapshot may include calculating a first checksum associated with each of the object record sets included in the snapshot, calculating a second checksum associated with each of the object record sets included in the previously stored snapshot; and identifying the at least one modified object record set based on a determination that the first checksum is different from the second checksum.

In some implementations, comparing the snapshot to a previously stored snapshot may include comparing tokens, e.g., name-value pairs for each object record set included in the snapshot with tokens for a corresponding object record set included in the previously stored snapshot.

Additional details of comparison techniques are described subsequently, with reference to FIGS. 9A and 9B.

Based on the comparison, one or more modified object record sets may be determined, and only the modified object record sets may be transmitted (published) to a second (target) database instance. This selectively may be advantageous and may reduce database traffic, and provide savings in computational processing, power, and provide for faster synchronization of database objects.

In some implementations, a user selected snapshot, or a generated snapshot may be automatically compared with a previously generated and stored (existing snapshot) or with object record sets included in a version history to detect modifications to object record sets. In some implementations, only modified object record sets may be published to a target database instance.

In some implementations, transmitting (publishing) the modified object record sets to the second database instance may include transmitting only constructively (e.g., addition and updating of records) modified object record sets.

In some implementations, transmitting the modified object record sets to the second database instance may include transmitting only destructively modified object record sets, wherein a destructively modified object record set comprises a modified object record set that includes at least one deleted record when compared to a corresponding object record set included in the previously generated snapshot.

Method 500 proceeds to block 530.

At block 530, a target (second) database instance may be updated with at least one of the one or more object record sets included in the snapshot.

In some implementations, prior to updating the second database instance, the snapshot may be compared to a previously stored snapshot associated with the second database instance to determine at least one modified object record set and only modified object record sets may be utilized to update the second database instance.

In some implementations, prior to updating the second database instance, a temporal (temporary) snapshot may be generated based on the corresponding root record and one or more connected records from the second database instance. For example, records from the application datastore of the second database instance may be collected using a specified connection configuration and object boundary identifiers.

The snapshot (e.g., snapshot received for updating from a first database instance) may be compared with the temporal snapshot to determine one or more modified object record sets. A user interface may be utilized to highlight modified object records to the user, and to receive a user input indicative of at least one modified object record set to be updated in the second database instance. The second database instance may then be updated with the at least one modified object record set. Utilization of a temporal snapshot in this matter may enable additional checks before a database instance is updated and may be useful for critical databases that have high availability requirements for uptime.

Processing proceeds to block 540. At block 540, the newly generated snapshot and/or snapshot metadata may be stored on one or more storage device(s) associated with the first database instance, the second data instance, and/or in storage devices associated with version history management. For example, the snapshot and a timestamp associated with the snapshot may be stored in a storage device associated with the first and/or second database instance.

In some implementations, a version identifier may be assigned to each object record set included in the snapshot based on a hierarchy of a record that was modified in at least one object record set that was observed to be modified.

In some implementations, storage of snapshots and versions may be further optimized to discard all records that have no change; only records that are modified or deleted or newly added are stored, while still tracking changes associated relative to one or more object boundary identifiers.

Method 500, or portions thereof, may be repeated any number of times using additional inputs. For example, blocks 515 and 520 may be repeated for each unique object boundary identifier. Portions of method 500 may also be performed in an order different from that described in FIG. 5. In another example, block 540 may be performed after block 520 at a source database instance and after block 525 at a destination database instance to store snapshots.

In another example, only block 515 to 540 may be performed to create snapshots from collected records for version management, even without receiving a request for synchronization.

Figure 9A:
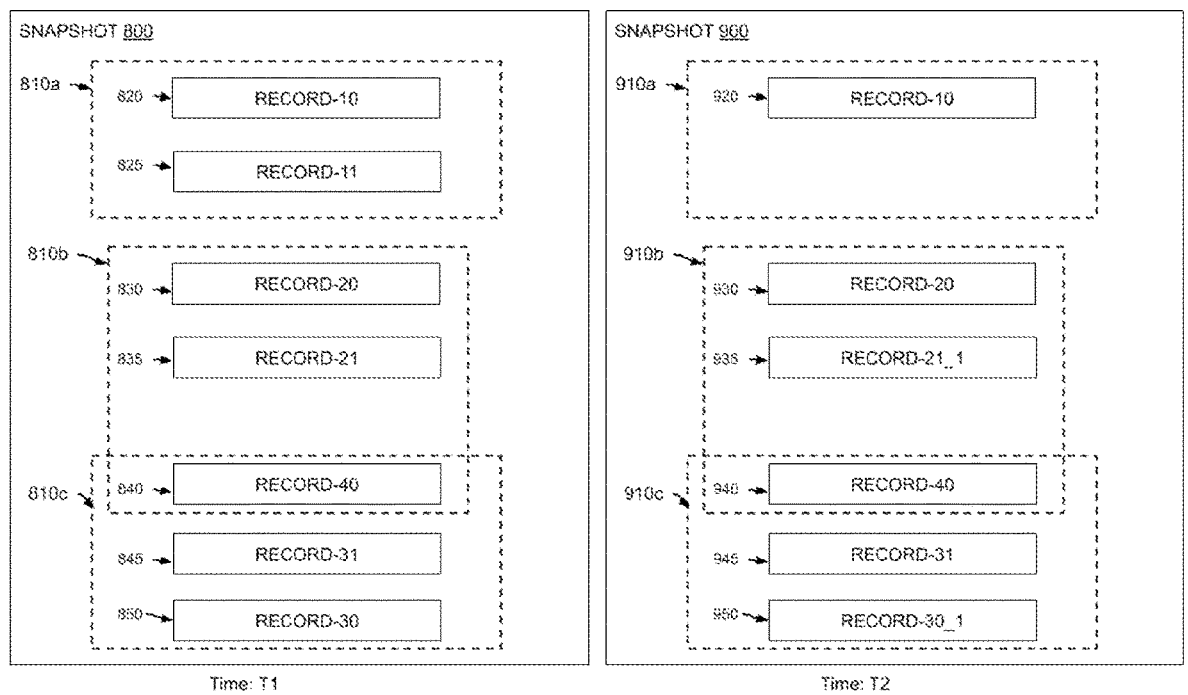
FIG. 9A depicts example comparison of snapshots, in accordance with some implementations.

FIG. 9A depicts example comparison of snapshots, in accordance with some implementations.

Comparisons of snapshots may be performed to determine modifications to sets of records, and more particularly to modifications of object record sets. In some implementations, comparison of two snapshots may include a comparison of constituent records, while in other implementations, only selected records may be compared. In some other implementations, normalizations may need to be applied to facilitate accurate comparison. For example, it may be necessary to normalize records that are encrypted or decrypted, or to take into mapping normalizations, case-sensitive normalizations, etc. Where records are uniquely identifiable, one can use corresponding identifiers to match and compare records.

Comparisons of object record sets may utilize checksums, token-based comparison, selective token based comparison that ignores certain tokens, normalized comparisons based on various normalization patterns (encryption/decryption or mapping based normalization etc.), time stamp-based comparisons, or combinations thereof may be utilized to perform comparisons.

FIG. 9A depicts a comparison of two snapshots. The two snapshots may have been taken, for example, at different times on the same database instance. Alternately, it may also be possible to compare snapshots are made at different times across different instances of databases.

In some implementations, comparison policies may be specified to configure the comparison suitably. In some implementations, prior to comparison, a check for a last modified date associated with a record may be performed as a pre-check to verify if underlying records may have been modified or not. In another implementation, one could use checksum strategies to compare if anything has changed. In yet another implementation, one could compare token by token comparison. There could be a combination of these techniques and similar techniques used for comparison. Comparison of records and object record sets enable identification of destructive and constructive changes at the snapshot level.

Per techniques of this disclosure, in addition to record level comparison, association of records with corresponding object boundary identifiers (and an object record set boundary) enables identification of constructive and destructive changes at the object record set level.

In this illustrative example, as depicted in FIG. 9A, snapshot 800 is being compared with snapshot 900. Record identifiers are utilized to enable comparison between sets of records associated with a particular root record.

A comparison of object record set 810a with corresponding object record set 910a indicates that record 825 has been deleted and is indicative of a destructive change in object records set 910a.

A comparison of object record set 810b with corresponding object record set 910b indicates that while a root record 830 ('RECORD-20') is unchanged to root record 930, a connected (dependent) record 835 ('RECORD-21') has been modified in connected (dependent) record 935 ('RECORD-21-_1').

A comparison of object record set 810c with corresponding object record set 910c indicates that a root record 850 ('RECORD-30') has been modified to root record 950 ('RECORD-30_1').

Additionally, modifications detected during comparison of object record sets may be percolated from a connected (dependent) record(s) to the root record element associated with the object boundary identifier of the connected (dependent) record(s). In some implementations, a distinction may be made to differentiate connected (dependent) record modifications to the root record modifications.

In some implementations, a user may be provided with a display and/or notification of all modifications that occurred on all the records in the snapshot. In another implementation, the user may be provided with a display and/or notifications of modifications consolidated at the level of the root record; a visualization at the level of the object record set may be more useful to a business user. Version identification information may be provided relative to a primary boundary, a secondary boundary, a tertiary boundary, etc., and may enable a user to navigate and view modifications at different boundary affinities.

Comparison at an object record set level may additionally enable a user to be able to select changes at the root record level and publish modified root records along connected records, thereby providing visibility and selectivity before publishing.

Figure 9B:
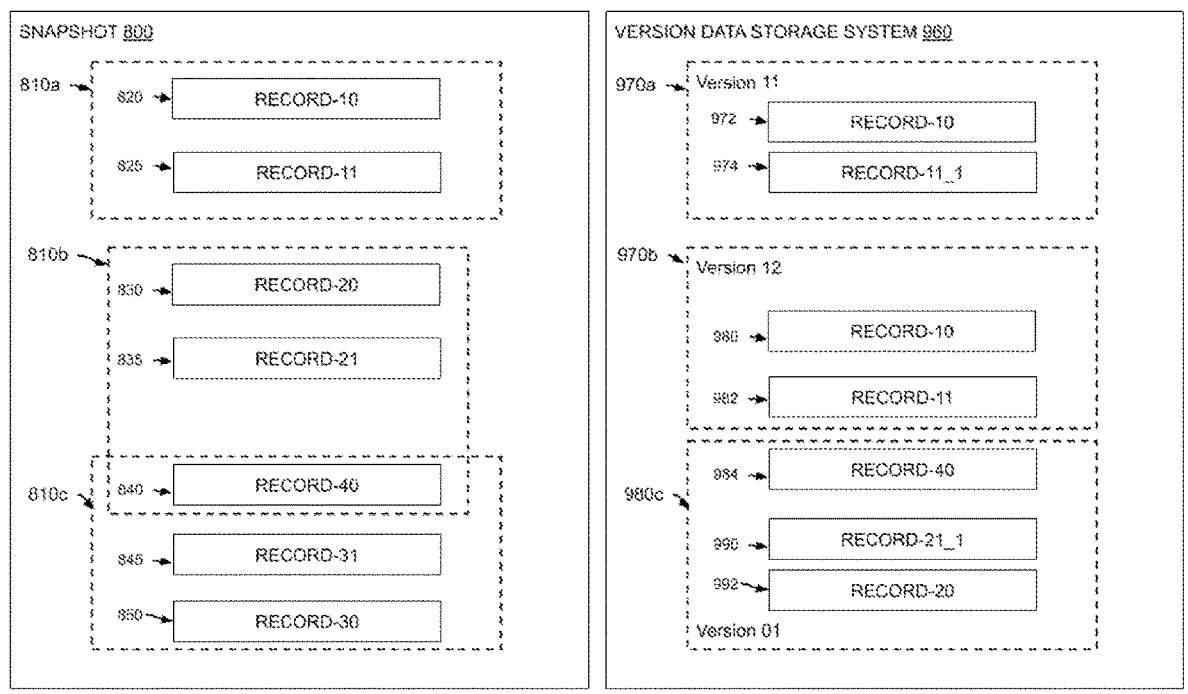
FIG. 9B depicts example comparison of object record sets in a snapshot with corresponding object record sets in a version data storage system, in accordance with some implementations.

FIG. 9B depicts example comparison of object record sets in a snapshot with corresponding object record sets in a version data storage system, in accordance with some implementations.

In some implementations, a snapshot is compared with records included in a Version Data Storage System. In a version data storage system, an object record sets may be stored as multiple copies, based on different times of creation of the corresponding version.

As depicted in FIG. 9B, object record sets 970a and 970b represent two versions of the same object record set in the VDSS (e.g., Version 11 and Version 12). Policies may be specified for comparison of a records included in a snapshot with records included in a VDSS, for example, with a latest version etc. Upon selection of a suitable version, e.g., based on policy, a comparison process is utilized to perform record level comparison and percolate the changes as needed and log/track any modifications.

Based on a comparison, if it is detected that a record or object record set has been modified, a user may be provided with an option to check-in the modifications to the VDSS and anew (updated) version may be created, and a version number of an object record set associated with the root record may be incremented. For example, based on a comparison of object record set 810b with a corresponding object record set 980c from the VDSS, it may be determined that the root record ('RECORD-20') is not modified, but a connected (dependent) record 835 ('RECORD-21') is modified when compared to object 990 ('RECORD-21_1'). A user may be provided with an option to check-in the modified object record set into the VDSS with an incremented version identifier.

In some implementations, the version increment may be chronological and/or sequential. In some other implementations, versioning with additional granularity may be utilized. For example, major/minor versioning or alphanumeric versioning may be utilized to distinguish between modifications detected at a root record level when compared to modifications detected to connected records. A version identifier assigned to each modified object record set may be based on a hierarchy of a record that was modified in the object record set.

Object record sets may be added to a VDSS if it is detected that a corresponding object records set is not stored in the VDSS. For example, as depicted in FIG. 9B, it may be determined that the VDSS does not include any version of object record set 810c. A user may be provided with an option to check-in a version of object record set 810c.

Additionally, in some implementations, only an object record set associated with a primary boundary identifier (e.g., an object record set that includes records 845 and 850) may need to be checked in.

In some implementations, records included in a snapshot may also be compared to records in an Application data store. This comparison may enable determination of all the constructive and destructive changes across the entire snapshot and also indicate modifications as they may be localized to each of the object record set boundaries. A user may be provided with an option to select object record sets to be updated on the application datastore.

Comparison of snapshots and of object record sets included in the snapshots enables detection of record modifications—updates, deletes, inserts, etc.; additionally, comparisons within a primary or secondary object boundary enables detection of modifications of connected records and percolation of change detection to a level of the main element (root record).

In some implementations, a comparison of object records sets is performed at a source database instance (with a previously generated/stored snapshot) before publishing a snapshot to a target database instance, thereby enabling selective publishing of database objects.

In some implementations, a comparison of object record sets is performed at a target database instance (with a previously generated/stored snapshot or a temporally generated snapshot) before deploying the snapshot, e.g., in an application data source associated with the target database instance, thereby enabling selective deployment of database objects.

In some implementations, a comparison of object record sets is performed with a suitable version (e.g., latest version) at a VDSS. Modified object record sets detected in a snapshot may be propagated to the VDSS as a current (latest) version and may be implemented at a source database instance and/or a target database instance. A version check-in may be performed either before or after deployment.

In some implementations, a Revert action or an UNDO of a SNAPSHOT previously deployed may be performed. In some implementations, the revert or UNDO operation may be performed selectively where only selected object record sets may be reverted/undone, while leaving the remaining object record sets in a state of deployment. This may be advantageous where only some object record sets may have been erroneously published and/or deployed and may avoid repetition of operation of generation of a fresh snapshot, publishing the snapshot, and deployment of the snapshot.

In some implementations, a reversion operation may include reversion to an older version that is stored in the VDSS.

Figure 10A:
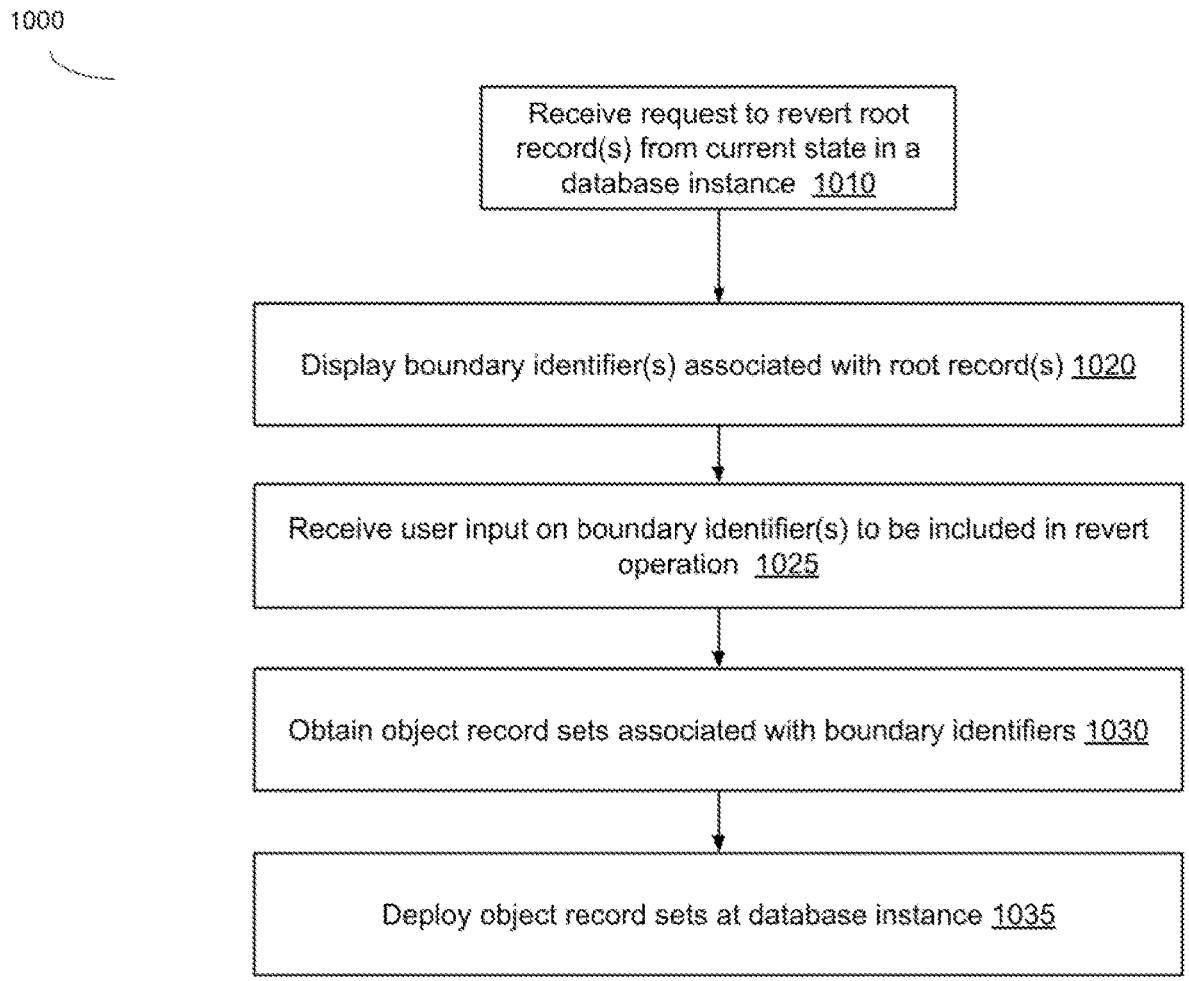
FIG. 10A is a flowchart illustrating an example method to revert one or more root records, in accordance with some implementations.

FIG. 10A is a flowchart illustrating an example method 1000 to revert one or more root records, in accordance with some implementations.

In some implementations, method 1000 can be implemented, for example, a server associated with enterprise system 150 described with reference to FIG. 1B. In some implementations, some or all of the method 1000 can be implemented on one or more of subsystems included in enterprise system 150 as shown in FIG. 1B, on one or more developer devices, or on one or more server devices, and/or on a combination of developer device(s), server device(s) and client device(s). In described examples, the implementing system includes one or more digital processors or processing circuitry ("processors"), and one or more storage devices (e.g., a datastore 155, 185, or other storage device). In some implementations, different components of one or more servers and/or clients can perform different blocks or other parts of the method 500. In some examples, a first device is described as performing blocks of method 1000. Some implementations can have one or more blocks of method 1000 performed by one or more other devices (e.g., other client devices or server devices) that can send results or data to the first device.

Method 1000 may begin at block 1010.

At block 1010, a request is received at a database instance to revert a root record (or one or more root records) from a current state of an application datastore to a previous state of the application datastore. Processing proceeds to block 1020.

At block 1020, one or more object boundary identifiers associated with the root record(s) are displayed via a user interface. In some implementations, a snapshot that includes the root record(s) may be identified. The snapshot(s) may be obtained from one or more versions of the snapshot stored in a storage device associated with the database instance and/or a storage device associated with a version data storage system. Processing proceeds to block 1025.

At block 1025, user input indicating a subset of the object boundary identifiers to be utilized to revert the root record is received via the user interface. Processing proceeds to block 1030.

At block 1030, a plurality of object record sets associated with the subset of the object boundary identifiers are obtained. Processing proceeds to block 1035.

At block 1035, the plurality of obtained object record sets is deployed in the database instance.

Figure 10B:
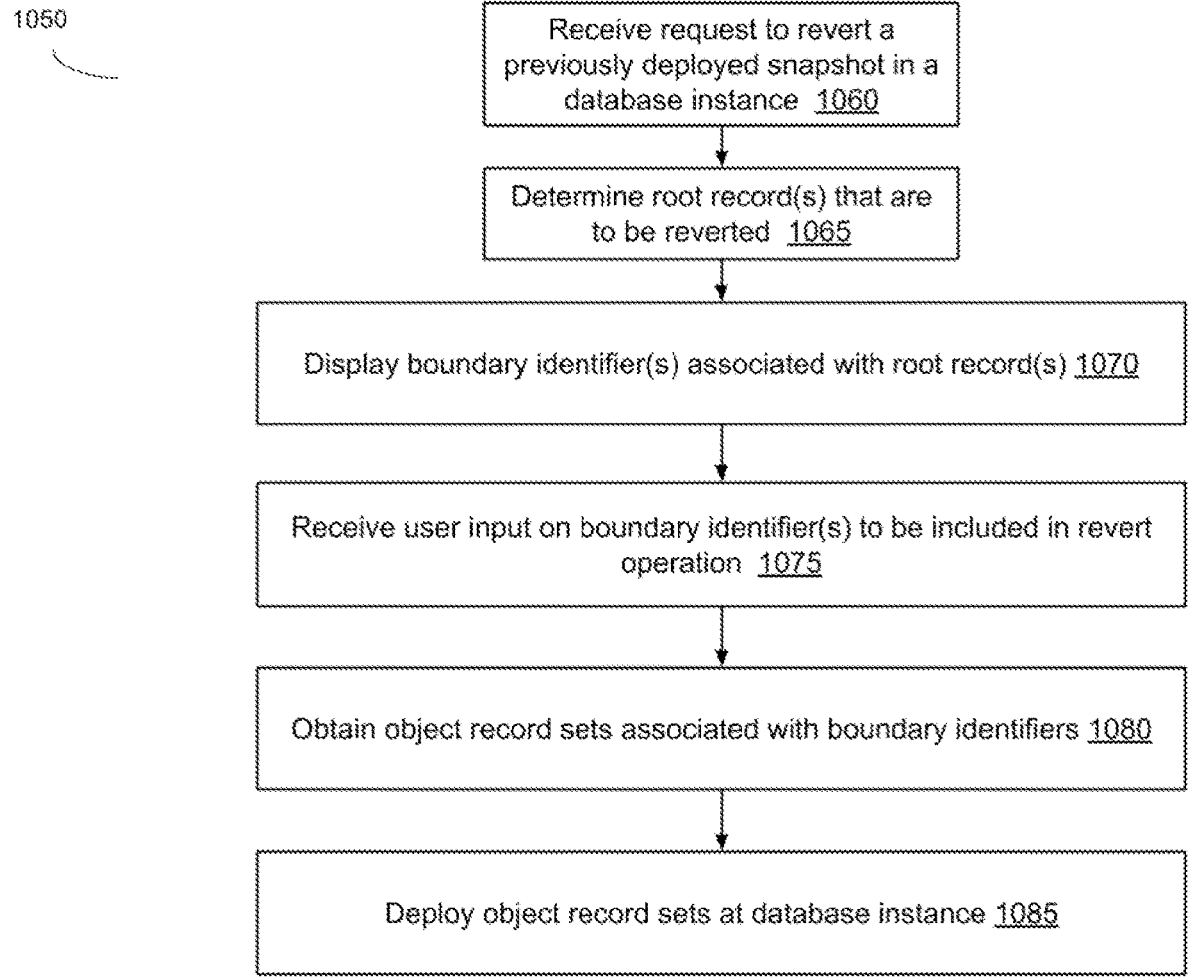
FIG. 10B is a flowchart illustrating an example method 1050 to revert a previously deployed snapshot, in accordance with some implementations.

FIG. 10B is a flowchart illustrating an example method 1050 to revert a previously deployed snapshot, in accordance with some implementations.

In some implementations, method 1050 can be implemented, for example, a server associated with enterprise system 150 described with reference to FIG. 1B. In some implementations, some or all of the method 1050 can be implemented on one or more of subsystems included in enterprise system 150 as shown in FIG. 1B, on one or more developer devices, or on one or more server devices, and/or on a combination of developer device(s), server device(s) and client device(s). In described examples, the implementing system includes one or more digital processors or processing circuitry ("processors"), and one or more storage devices (e.g., a datastore 155, 185, or other storage device). In some implementations, different components of one or more servers and/or clients can perform different blocks or other parts of the method 500. In some examples, a first device is described as performing blocks of method 1000. Some implementations can have one or more blocks of method 1050 performed by one or more other devices (e.g., other client devices or server devices) that can send results or data to the first device.

Method 1050 may begin at block 1060.

At block 1060, a request to revert a previously deployed snapshot is received at a database instance. The snapshot may be selected from one or more versions of the snapshot stored in a storage device associated with the database instance and/or a storage device associated with a version data storage system. Processing proceeds to block 1065.

At block 1065, one or more root records to be reverted are determined. Processing proceeds to block 1070.

At block 1070, one or more object boundary identifiers associated with the root record(s) are displayed via a user interface. Processing proceeds to block 1075.

At block 1075, user input indicating a subset of the object boundary identifiers to be utilized to revert the root record is received via the user interface. Processing proceeds to block 1080.

At block 1080, a plurality of object record sets associated with the subset of the object boundary identifiers are obtained. Processing proceeds to block 1085.

At block 1085, the plurality of obtained object record sets is deployed in the database instance.

Figure 11:
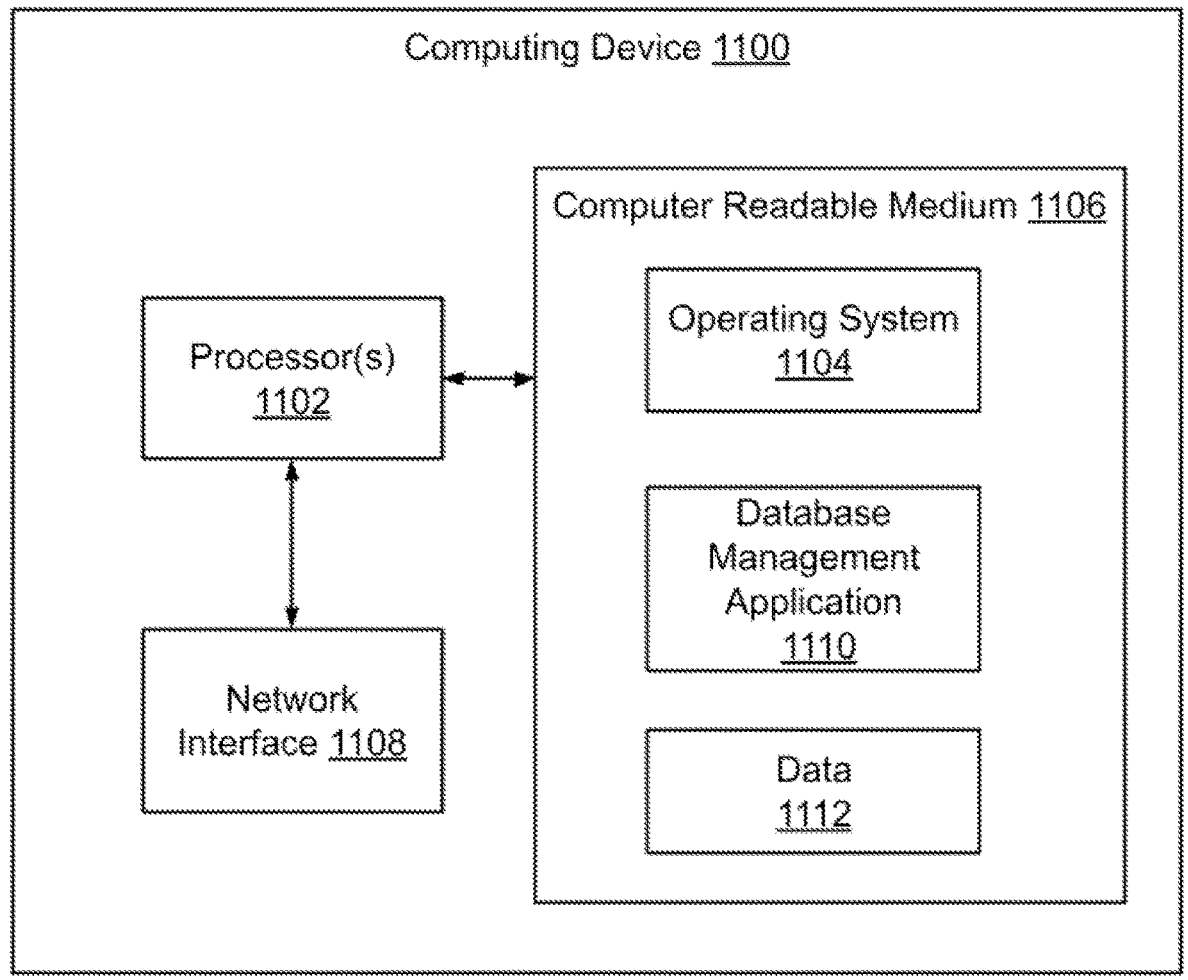
FIG. 11 is a block diagram illustrating an example computing device, in accordance with some implementations.

FIG. 11 is a block diagram of an example computing device 1100 which may be used to implement one or more features described herein. In one example, device 1100 may be used to implement a computer device (e.g., any of subsystems 150, 165, 170, 175, 180, and/or 190 depicted in FIG. 1B), and perform appropriate method implementations described herein. Computing device 1100 can be any suitable computer system, server, or other electronic or hardware device. For example, the computing device 1100 can be a mainframe computer, desktop computer, workstation, portable computer, or electronic device (portable device, mobile device, cell phone, smartphone, tablet computer, television, TV set top box, personal digital assistant (PDA), etc.). In some implementations, device 1100 includes a processor 1102, a memory 1106, input/output (I/O) interface 1106, and audio/video input/output devices 1114.

Processor 1102 can be one or more processors and/or processing circuits to execute program code and control basic operations of the device 1100. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Computer-readable medium (memory) 1106 is typically provided in device 1100 for access by the processor 1102 and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1102 and/or integrated therewith. Memory 1106 can store software operating on the server device 1100 by the processor 1102, including an operating system 1104, one or more applications 1110 and application data 1112. In some implementations, application 1110 can include instructions that enable processor 1102 to perform the functions (or control the functions of) described herein, e.g., some or all of the methods described with respect to FIGS. 5 and 10.

Elements of software in memory 1106 can alternatively be stored on any other suitable storage location or computer-readable medium. In addition, memory 1106 (and/or other connected storage device(s)) can store instructions and data used in the features described herein. Memory 1106 and any other type of storage (magnetic disk, optical disk, magnetic tape, or other tangible media) can be considered "storage" or "storage devices."

An I/O interface can provide functions to enable interfacing the server device 1100 with other systems and devices. For example, network communication devices, storage devices (e.g., memory and/or data store 120), and input/output devices can communicate via the interface. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 11 shows one block for each of processor 1102, memory 1106. These blocks may represent one or more processors or processing circuitries, operating systems, memories, I/O interfaces, applications, and/or software engines. In other implementations, device 1100 may not have all of the components shown and/or may have other elements including other types of elements instead of, or in addition to, those shown herein. While the processing system 170 is described as performing operations as described in some implementations herein, any suitable component or combination of components of processing system 170 or similar system, or any suitable processor or processors associated with such a system, may perform the operations described.

A user device can also implement and/or be used with features described herein. Example user devices can be computer devices including some similar components as the device 1100, e.g., processor(s) 1102, memory 1106, etc. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices, for example, can be connected to (or included in) the device 1100 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods 500 and 1000) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device, laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method, comprising:
   receiving a request to synchronize one or more records that include a corresponding root record and one or more connected records from a first database instance to a second database instance, wherein the request includes a specified graph configuration and an object boundary identifier associated with each of the one or more root records and the one or more connected records;
   collecting the one or more records by traversing a corresponding graph configuration associated with each of the one or more root records;
   generating a snapshot that includes the one or more records, wherein generating the snapshot includes assembling the one or more records into one or more object record sets based on a corresponding object boundary identifier associated with each of the one or more root records and the one or more connected records;
   publishing the snapshot to the second database instance; and
   updating the second database instance with at least one of the one or more object record sets included in the snapshot.

2. The computer-implemented method of claim 1, further comprising:
   prior to updating the second database instance, comparing the snapshot to a previously stored snapshot associated with the second database instance to determine at least one modified object record set; and
   updating the second database instance with the at least one modified object record set.

3. The computer-implemented method of claim 2, wherein comparing the snapshot to the previously stored snapshot comprises:
   calculating a first checksum associated with each of the object record sets included in the snapshot;
   calculating a second checksum associated with each of the object record sets included in the previously stored snapshot; and
   identifying the at least one modified object record set based on a determination that the first checksum is different from the second checksum.

4. The computer-implemented method of claim 2, wherein comparing the snapshot to the previously stored snapshot comprises comparing tokens for each object record set included in the snapshot with tokens for a corresponding object record set included in the previously stored snapshot.

5. The computer-implemented method of claim 2, further comprising storing the snapshot and a timestamp associated with the snapshot in a storage device associated with the first database instance.

6. The computer-implemented method of claim 5, further comprising assigning a version identifier to each object record set included in the snapshot based on a hierarchy of a record that was modified in the at least one modified object record set.

7. The computer-implemented method of claim 2, wherein comparing the snapshot to the previously stored snapshot comprises:
   receiving a user input indicative of one or more object boundary identifiers of interest for comparison; and
   comparing object record sets associated with the one or more object boundary identifiers of interest included in the snapshot with corresponding object record sets included in the previously stored snapshot.

8. The computer-implemented method of claim 1, further comprising:
   prior to updating the second database instance, generating a temporal snapshot based on the corresponding root record and one or more connected records from the second database instance;
   comparing the snapshot to the temporal snapshot to determine one or more modified object record sets;
   displaying, via a user interface, identifiers corresponding to the one or more modified object record sets and corresponding boundary identifiers associated with the one or more modified object record sets;
   receiving a user input indicative of at least one modified object record set to be updated in the second database instance; and
   updating the second database instance with the at least one modified object record set.

9. The computer-implemented method of claim 1, wherein the publishing the snapshot to the second database instance comprises:

comparing the snapshot with a previously generated snapshot associated with the first database instance to determine one or more modified object record sets;
displaying, via a user interface, the one or more modified object record sets;
receiving a selection of a subset of the one or more modified object record sets; and
transmitting the subset of the one or more modified object record sets to the second database instance.

10. The computer-implemented method of claim 9, wherein transmitting the modified object record sets to the second database instance comprises transmitting only destructively modified object record sets, wherein a destructively modified object record set comprises a modified object record set that includes at least one deleted record when compared to a corresponding object record set included in the previously generated snapshot.

11. The computer-implemented method of claim 1, wherein the object boundary identifiers comprise a primary object boundary identifier and a secondary object boundary identifier, and wherein a root record associated with a primary object boundary identifier and included in a first object record set is not included in a second object record set of the record set.

12. The computer-implemented method of claim 1, wherein each root record is associated with at least a primary object boundary identifier and a secondary object boundary identifier, wherein the primary object boundary identifier is different from the secondary object boundary identifier.

13. The computer-implemented method of claim 1, further comprising storing the snapshot and a timestamp associated with the snapshot in a storage device associated with the second database instance.

14. A computer-implemented method, comprising:
receiving a request, at a database instance, to revert a root record from a current deployment state of an application datastore to a previous state of the application datastore;
obtaining a snapshot that includes the root record;
displaying, via a user interface, one or more object boundary identifiers associated with the root record;
receiving, via the user interface, user input indicating a subset of the object boundary identifiers to be utilized to revert the root record and one or more connected records;
obtaining a plurality of object record sets associated with the subset of the object boundary identifiers, wherein each of the plurality of object record sets includes the root record and one or more connected records connected to the root record, and wherein the one or more connected records are associated with a corresponding object boundary identifier of the subset of the object boundary identifiers; and
deploying the plurality of object record sets in the database instance.

15. The computer-implemented method of claim 14, wherein selecting a snapshot that includes the root record comprises selecting the snapshot from one or more versions of the snapshot stored in one of: a storage device associated with the database instance and a storage device associated with a version data storage system.

16. The computer-implemented method of claim 14, further comprising prior to receiving the request to revert the root record, receiving a request to revert a snapshot that was previously deployed in the database instance, wherein the snapshot includes the root record.

17. A non-transitory computer-readable medium comprising instructions that, responsive to execution by a processing device, causes the processing device to perform operations comprising:
receiving a request to generate a snapshot of one or more records that include a corresponding root record and one or more connected records associated with a database instance, wherein the request includes a specified graph configuration and an object boundary identifier associated with each of the one or more root records and the one or more connected records;
collecting the one or more records by traversing a corresponding graph configuration associated with each of the one or more root records; and
generating the snapshot that includes the one or more records, wherein generating the snapshot includes assembling the one or more records into one or more object record sets based on a corresponding object boundary identifier associated with each of the one or more root records and the one or more connected records.

18. The non-transitory computer-readable medium of claim 17, further comprising storing the snapshot and a timestamp associated with the snapshot in a storage device associated with the database instance.

19. The non-transitory computer-readable medium of claim 17, wherein storing the snapshot comprises:
obtaining a previous version of the snapshot;
comparing the object record sets in the snapshot with corresponding object record sets in the previous version of the snapshot to determine one or more modified object record sets; and
storing the one or more modified object record sets as the snapshot.

20. The non-transitory computer-readable medium of claim 19, wherein comparing the object record sets in the snapshot with corresponding object record sets in the previous version of the snapshot comprises comparing tokens for each object record set included in the snapshot with tokens for a corresponding object record set included in the previous version of the snapshot.

21. The computer-implemented method of claim 14, wherein obtaining the plurality of object record sets associated with the subset of the object boundary identifiers comprises obtaining a number of object record sets that is fewer than a total number of object record sets included in the snapshot.

22. The computer-implemented method of claim 14, wherein obtaining the plurality of object record sets associated with the subset of the object boundary identifiers comprises traversing a graph configuration, wherein the graph configuration is utilized to specify a configuration of the root record and the one or more connected records.

* * * * *